United States Patent
Yang (10) Patent No.: US 7,726,430 B2
(45) Date of Patent: Jun. 1, 2010

(54) ENERGY STORAGE TYPE OF DIFFERENTIAL HYBRID POWER DISTRIBUTION SYSTEM

(76) Inventor: Tai-Her Yang, No. 59, Chung Hsing 8 St., Si-Hu Town, Dzan-Hwa (TW)

( * ) Notice: Subject to any disclaimer, the term of this patent is extended or adjusted under 35 U.S.C. 154(b) by 203 days.

(21) Appl. No.: 11/950,363

(22) Filed: Dec. 4, 2007

(65) Prior Publication Data
US 2009/0139789 A1 Jun. 4, 2009

(51) Int. Cl.
*B60K 17/356* (2006.01)
(52) U.S. Cl. .................. 180/242; 180/247; 180/245; 180/65.21; 180/65.31
(58) Field of Classification Search .......... 180/242, 180/247, 245, 65.2, 65.3
See application file for complete search history.

(56) References Cited
U.S. PATENT DOCUMENTS

| | | | |
|---|---|---|---|
| 5,346,031 A * | 9/1994 | Gardner | 180/179 |
| 5,562,566 A * | 10/1996 | Yang | 477/3 |
| 6,205,379 B1 * | 3/2001 | Morisawa et al. | 701/22 |
| 6,578,681 B1 * | 6/2003 | Raad | 188/267 |
| 6,781,251 B2 * | 8/2004 | Takaoka et al. | 290/40 C |
| 6,857,985 B2 * | 2/2005 | Williams | 477/5 |
| 2004/0222029 A1 * | 11/2004 | Shigeta et al. | 180/245 |

\* cited by examiner

*Primary Examiner*—Lesley Morris
*Assistant Examiner*—Marlon A Arce
(74) *Attorney, Agent, or Firm*—Rabin & Berdo, P.C.

(57) ABSTRACT

An energy storage type of differential hybrid power distribution system to drive an all wheel driving carrier; a revolution output end of an internal combustion engine (or any other revolution power source) to drive the front wheel through an intermediate transmission and control interface device, and to also drive an input end of the energy storage type of differential hybrid power device to output kinetics to further drive the rear wheel; and an electro-mechanical unit functioning as a generator and a motor being disposed in the energy storage type of differential hybrid power device to regulate the power distribution between the front wheel and the rear wheel by controlling the electro-mechanical unit to operate as a motor or as a generator.

4 Claims, 2 Drawing Sheets

ENERGY STORAGE TYPE OF DIFFERENTIAL HYBRID POWER DISTRIBUTION SYSTEM

BACKGROUND OF THE INVENTION (a) Field of the Invention

The present invention is related to an energy storage type of differential hybrid power distribution system, and more particularly to one that provides real time power distribution of for the kinetics to drive the front wheel and the rear wheel by an all wheel driving carrier for promoting drivability and drive safety under severe road and weather conditions as well as for operating with hybrid power.

(b) Description of the Prior Art

Conventional all wheel driving (AWD) is generally referred to four wheel driving, respectively two front wheels and two rear wheels; two front and one rear, or one front wheel and two rear wheels driving; or six-, even up to eight-wheel driving with additional rear wheels. Currently AWD is roughly classified into two systems:

(1) Full Time Driving: the engine power drives both of the front and the rear wheel in full time, and an additional differential damper such as the VW's SYNCRO is each disposed between the power source and the motive power side, as well as the power source and the rear wheel set. The advantages of this pattern include that both of the front and the rear wheel are given driving power and good driving performance while flaws including greater power loss and higher fuel consumption are observed.

(2) Real Time Driving: in this pattern, a controllable clutch subject to mechanical, electromagnetic, or fluid force is disposed between the rear wheel and the power source; when driving warrants, the clutch is closed up through the control by manual or automatic detection to drive the rear wheel, otherwise the front-drive takes over in case of general road conditions to save fuel consumption. However, this pattern, either in manual or automatic control mode, an immediate response is prevented when the road condition warrants since there is a slight delay in the timing for the rear wheel to generate kinetics.

(3) Alternatively, an intermediate differential wheel set is provided between the front and the rear wheel; however, the flaw of this pattern is that either differential output end skids, the other differential output end loses its power. That is, if the front wheel skids, the rear wheel is deprived of its power.

All those three patterns described above share the common flaw that once either wheel set skids, the other wheel set loses its power. If an additional anti-skid damper is mounted, it means more lose of power, accelerated temperature rise to the mechanical parts, and significant drop of power performance to result in:

1. In case of bumpy road condition, the rear wheel are prevented from engaging in asynchronous drive with the front wheels, for example, under circumstances when the rear wheel must run faster than the front wheel do.

2. In case of climbing a slope, or upon starting up under heavy load, controlling the rear wheel to produce power greater than that by the front wheels fails.

Distribution of power for the front and the rear wheel at random is impossible.

SUMMARY OF THE INVENTION

The primary purpose of the present invention is to provide an energy storage type of differential hybrid power distribution system to drive an all wheel driving carrier. Wherein, the revolution output end of an internal combustion engine (or any other revolution power source) drives the front wheel through an intermediate transmission and control interface device; and drives an input end of the energy storage type of differential hybrid power device to output kinetics to further drive the rear wheel. An electro-mechanical unit functioning as a generator or a motor is disposed in the energy storage type of differential mix power device to regulate the power distribution between the front wheel and the rear wheel by controlling the electro-mechanical unit to operate as a motor or as a generator and to operate with hybrid power.

LISTING OF COMPONENT AND CORRESPONDING LABEL

100: revolution power unit
101: revolution output end
102, 1016, 1116: clutch
103: intermediate transmission and control interface device
104: differential hybrid power device
105, 110: differential shaft
106: front-wheel transmission assembly
107: front wheel
108: electromechanical device
109: 3-end shaft differential wheel set
111: input shaft
1017: front-wheel differential wheel set
113: rear-wheel differential wheel set
114: rear wheel
115: drive circuit device
116, 126: brake
117: rechargeable device
118: central controller

DETAILED DESCRIPTION OF THE PREFERRED EMBODIMENTS

An energy storage type of differential hybrid power distribution system of the present invention adapted to an all wheel driving (AWD) transportation means is essentially having an output end from an internal combustion engine (or any other revolving power source) to deliver revolving kinetics through an intermediate transmission and control interface device or a coupling device providing gear-changing or clutching function so that to transmit power to drive a front wheel via the front-wheel transmission assembly, and to transmit power to an input end of a storage type of differential hybrid power device, then to drive a rear wheel through an output end of the storage type of differential hybrid power device. The storage type of differential hybrid power device includes an electro-mechanical unit provided with functions as a motor and as a generator, a three-end shaft differential wheel set, a rechargeable device, and a power control device. The three-end shaft differential wheel set includes two differential shafts and an input shaft. The input shaft is directly or indirectly through a transmission coupled to a rotation part of the electromechanical device, one differential shaft is coupled to the end for outputting revolving kinetics of the intermediation transmission and interface control device, and the other differential shaft drives a rear wheel or drives other loads.

An optional brake is disposed between the shaft of the rotor and the case of the static part of the electromechanical device. The brake subject to a control device controls the status of closed or released between the shaft of the rotor and the case of the static part of the electromechanical device. With power inputted, the electromechanical device functions as a motor; or when driven by the revolving kinetics, functions as a generator to charge the rechargeable device or supply power to other loads needed to be driven by power. A reverse torque is created from the current outputted from the electromechanical device when functioning as a generator to create differential damper at the three-end shaft differential wheel set or to execute regenerated braking.

As required, the electromechanical device is subject to the control by a central controller and a drive circuit device to execute revolution clockwise or counter-clockwise as a motor, or to execute regenerated braking as a generator. With the engine as the primary drive power, and rpm difference between the front wheel and the rear wheel takes place due to changed road conditions or in case of driving on upward or downward slope or acute acceleration that warrants regulation of power distribution between the front wheel and the rear wheel, the electromechanical device from the differential hybrid power device to function as a generator to charge the rechargeable device thus to control its charging power and further the reverse torque of the electromechanical device; and finally to complete the passive regulation of the power distribution between the front wheel and the rear wheel.

In excising the regulation of the power distribution between the front wheel and the rear wheel when rpm difference between both wheels takes place due to changed road conditions, or the vehicle is driving on upward or downward slope, or executing acute acceleration, the electromechanical device may be subject to the control by the central controller and the drive circuit device to execute revolving output for driving the load alone, or jointly with the engine to drive both the front wheel and the rear wheel at the same time by having the power from the rechargeable device to drive the electromechanical device to function as a motor engaging in revolution clockwise or counter-clockwise; or alternatively to execute active regulation of the power distribution between the front wheel and the rear wheel by taking advantage of the revolution clockwise or counter-clockwise of the motor.

Figure 1:
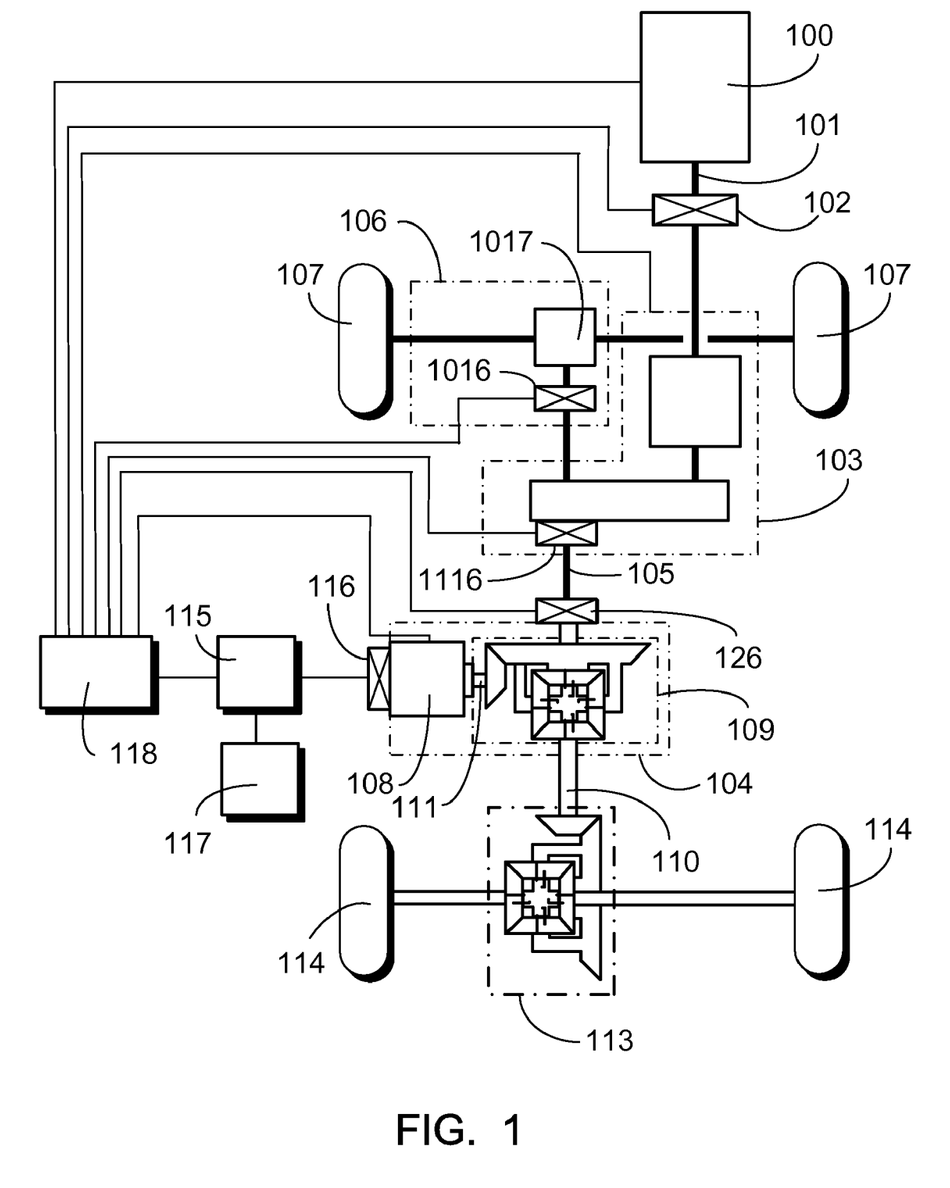
FIG. 1 is a block chart of a preferred embodiment of the present invention.
Figure 2:
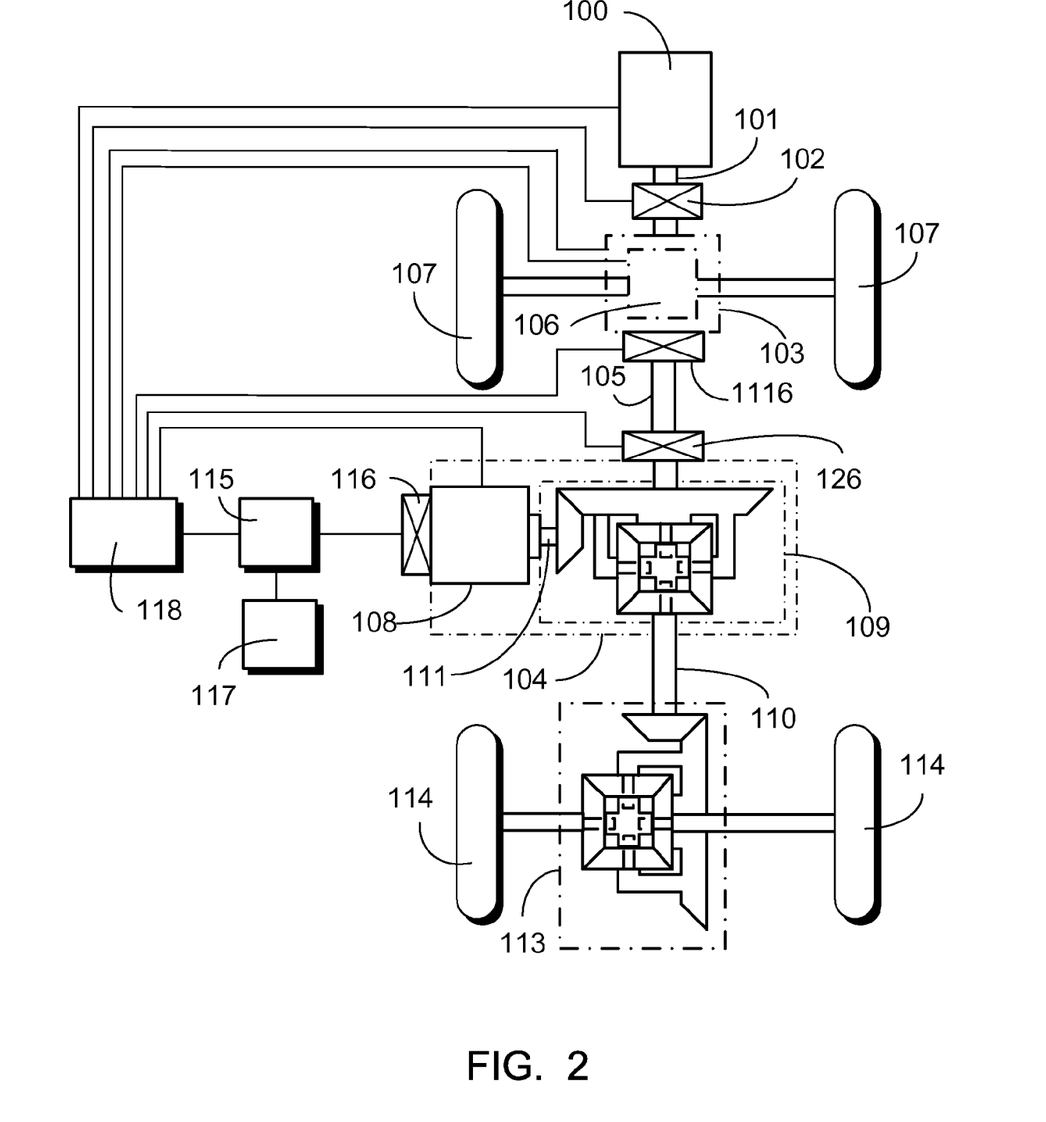
FIG. 2 is a schematic view showing a construction of a cut-away from FIG. 1 of the preferred embodiment of the present invention.

Referring to FIGS. 1, and 2 respectively for a schematic view of a preferred embodiment of the present invention and a schematic view showing a construction of a cut-away from FIG. 1, a preferred embodiment of the present invention is essentially comprised of:

a revolution power unit 100: comprised of an internal combustion engine or other revolution power source, a revolution output shaft 101, through a clutch 102 or an intermediate transmission and control interface device 103 that provides gearshift function, then through the front-wheel transmission assembly 106 to drive a front wheel 107, and through a differential hybrid power device 104 directly or further through a differential wheel set 113 to drive a rear wheel 114;

the intermediate transmission and control interface device 103: comprised of a conventional man-machine operation interface device including an automatic transmission or manual transmission or manually controlled automatic gearshift device and other clutches provided for gearshift to drive the front wheel 107; the input end of the intermediate transmission and control interface device 103 receives the input of revolving kinetics from the revolution power unit 100 and one of its output ends drives a front-wheel transmission assembly 106 to further drive the front wheel 107; and the other output end of the intermediate transmission and control interface device 103 is provided for coupling the differential shaft 105 of the differential hybrid power device 104 to transmit revolving kinetics for the other differential shaft 110 of the differential hybrid power device 104 to directly or indirectly through the differential wheel set 113 couple to a rear wheel 114;

the differential hybrid power device 104: comprised of an electromechanical device 108 incorporated with a three-end shaft differential wheel set 109 including two differential shafts 105, 110, and a set of input shaft 111; the input shaft is directly or indirectly coupled through a transmission device to the electromechanical device 108, the differential shafts 105 is directly or indirectly coupled through a clutch 1116 to the revolving kinetics output end of the intermediate transmission and control interface device 103, and the other differential shaft 110 is directly or indirectly through a differential wheel set 113 coupled to the rear wheel 114 or drives other loads. The three-end shaft differential wheel set 109 may be replaced with a planetary wheel set and a gear set may be also replaced with a friction transmission device or any other transmission;

the differential shaft 105: to output through the intermediate transmission and control interface device 103 with its rpm at the same ratio as or a different ratio from that of from the output shaft 101 of the revolution power unit 100;

the front-wheel transmission assembly 106: an optional item comprised of a conventional transmission mechanism to input the revolving kinetics from the intermediate transmission and control interface device 103 to further drive the front wheel 107; an optional front-wheel differential wheel set 1017 may be adapted for both of the differential output ends of the differential wheel set 1017 to drive the front wheel 107; or alternatively, a transmission wheel set is provided to separately drive the load; or a controllable clutch 1016 is provided as required to transmit or cut off the revolving kinetics to drive the front-wheel differential wheel set 1017 and the front wheel 107 from the intermediate transmission and control interface device 103;

the clutch 1016: related to an optional clutch device driven by manual, mechanical, electromagnetic or eccentric force, or comprised of a one-way transmission, disposed between the revolving kinetics output end of the intermediate transmission and control interface device 103 and the front-wheel differential wheel set 1017 subject to the manipulation by a central controller 118 to execute engagement or disengagement operation, so to couple to or to cut from the revolving kinetics between the front wheel 107 and the intermediate transmission and control interface device 103;

the clutch 1116: related to an optional clutch driven by manual, mechanical, electromagnetic, fluid, or eccentric force, or to a one-way transmission; disposed at where between the revolving kinetics output end of the intermediate transmission and control interface device 103 and the differential shaft 105 of the differential hybrid power device 104 subject to the control by the central controller 118 to execute engagement or disengagement operation, so to couple to or to cut from the revolving kinetics between the intermediate transmission and control interface device 103 and the differential hybrid power device 104;

a brake 116: related to an optional braking device with its braking function controllable by manual, mechanical, electromagnetic, or fluid force; disposed at where between the rotor and the static case of the electromechanical device 108;

a brake 126: related to an optional braking device with its braking function controllable by manual, mechanical, electromagnetic, or fluid force; disposed at where between the rotor and the static case of the differential shaft 105;

the electromechanical device 108: comprised of an AC, DC, brush, or brush-less electromechanical structure to execute the drive by being subject to the drive circuit device 115, the optional brake 116 is disposed at where between the shaft and the case of the static part of the rotor with the brake 116 subject to the control by the central controller 118 to further control the braking or releasing the braking between the rotor and the case of static part of the electromechanical device 108;

when powered, the electromechanical device 108 functions as a motor; and when driven by the revolving kinetics, it functions as a generator to charge the rechargeable device 117 or supply power to other load. A reverse torque is created from the current outputted by the electromechanical device so to provide differential damper function at the three-end shaft differential wheel set coupled to the electromechanical device, or to provide regenerated braking function upon executing the braking. With the engine serving as the primary drive force and rpm differences takes place between the front wheel and the rear wheel due to changed road conditions, the electromechanical device 108 adapted to the differential hybrid power device 104 functions as a generator to charge the rechargeable device, and the power so charged controls the reverse torque of the electromechanical device 108, thus to provide the passive regulation of the power distribution between the front wheel and the rear wheel; and if rpm difference takes place between the front wheel and the rear wheel due to changed road conditions, or driving on upward or downward slope, or applying acute acceleration that warrants the regulation of the power distribution between the front wheel and the rear wheel, the electromechanical device 108 for being subject to the central controller 118 and the drive circuit device 115 is driven by the power supplied from the rechargeable device 117 to revolve clockwise or counter-clockwise as a motor to separately output revolving kinetics to drive the load or jointly with the engine to drive both the front wheel 107 and the rear wheel 114 at the same time; or to provide active regulation of the power distribution between the front wheel and the rear wheel by taking advantage of the motor revolving clockwise or counter-clockwise;

the drive circuit device 115: related to a dynamo-electric or solid status electronic device; disposed at where between the electromechanical device 108 and the rechargeable device 117 to operate according to the command given by the central controller 118 to control the electromechanical device 108 to function as a motor to revolve clockwise or counter-clockwise, or to control the electromechanical device 108 to function as a generator for charging the rechargeable device 117 or outputting the power to other load while controlling the power distribution between the front wheel and the rear wheel by controlling the outputted power to create reverse torque at the electromechanical device 108;

the central controller 118: related to a dynamo-electric or solid status electronic device for outputting control commands to the drive circuit device 115 so as to regulate the electromechanical device 108, the revolution power unit 100 as well as said clutches and brakes;

the rechargeable device 117: related to a rechargeable secondary battery, capacitor, or super-capacitor;

the front wheel 107: related to one or a plurality of wheel sets, tracks or other loads driven directly by the intermediate transmission and control interface device 103 or indirectly driven from the intermediate transmission and control interface device 103 through the optional front wheel transmission device 106; and the rear wheel 114: related to one or a plurality of wheel sets, tracks or other loads directly driven or driven through a transmission or a differential wheel set 113.

In the energy storage type of differential hybrid power distribution system, the structural configuration among each component is selectable as applicable and ways to construction are as follows, wherein:

ways to dispose the differential hybrid power device 104 can be selected upon structural requirements as follows:
(1) The differential hybrid power device 104 is co-structured with the differential wheel set 113; or
(2) The differential hybrid power device 104 is co-structured with the intermediate transmission and control interface device 103; or
(3) The differential hybrid power device 104 is disposed between the intermediate transmission and control interface device 103 and the differential wheel set 113.

ways to dispose the brake 126 and the clutch 1116 can be selected upon structural requirements as follows:
(1) The brake 126 is disposed to the differential hybrid power device 104; or
(2) The brake 126 together with the clutch 1116 is disposed to the intermediate transmission and control interface device 103; or
(3) The clutch 1116 is disposed to the intermediate transmission and control interface device 103; or
(4) The clutch 1116 together with the brake 126 is disposed to the differential hybrid power device 104; or
(5) The clutch 1116 is co-structured with the brake 126; or
(6) The clutch 1116 is disposed independently; or
(7) The brake 126 is disposed independently; or
(8) The brake 126 and the clutch 1116 are co-structured, but are disposed independently.

ways to dispose the clutch 102 can be selected upon structural requirements as follows:
(1) The clutch 102 is disposed to a revolving power unit 100; or
(2) The clutch 102 is disposed to the intermediate transmission and control interface device 103; or
(3) The clutch 102 is independently disposed between the revolving power unit 100 and the intermediate transmission and control interface device 103.

The differential regulation or power distribution between the front wheel 107 and the rear wheel 114 by the electromechanical device 108 adapted to the energy storage type of differential hybrid power distribution system is provided including that the power supplied from the rechargeable device 117 drives the electromechanical device 108 to function as a motor revolving clockwise or counter-clockwise to provide active regulation of the rpm difference or power distribution between the front wheel and the rear wheel; or the electromechanical device 108 as driven by the revolving kinetics through the 3-end shaft differential wheel set 109 functions as a generator to charge the rechargeable device 117 or supply power to other power driven load, the output of power so generated creates reverse torque at the electromechanical device 108 to provide the function of creating differential damper at the 3-end shaft differential wheel set 109 coupled to the electromechanical device 108, thus to provide passive regulation of the rpm difference between the front wheel 107 and the rear wheel 114.

The energy storage type of differential hybrid power distribution system of the present invention when applied in an all wheel driving carrier provides all or a part of the following functions through the operation of the intermediate transmission and control interface device 103 and the control by the central controller 118 to operate the clutch 102, the clutch 1016, the clutch 1116, the brake 116 and the brake 126, and to drive the electromechanical device 108 through the drive circuit device 115, including:

(1) when the engine operated as the revolution power unit 100, the clutch 102 is closed, the clutch 1016, 1116 and the brake 126, 116 are disengaged, the power supplied from the rechargeable device 117 subject to the control of the drive circuit device 115 drives the electromechanical device 108 to revolve clockwise or counter-clockwise as a motor so that to drive the rear wheel 114 by revolving together with the engine, thus regulating the power of the rear wheel 114 to facilitate the operation in various operational requirements including accelerating, climbing a slope, downgrading a slope, anti-sliding, and braking; or (2) when the engine operated as the revolution power unit 100, both of the clutches 102 and 1016 are closed, the brake 126 is disengaged, the clutch 1116 is closed and the brake 116 is disengaged, the power supplied from the rechargeable device 117 subject to the control of the drive circuit device 115 drives the electromechanical device 108 to revolve clockwise or counter-clockwise as a motor so that to drive the front wheel 107 and the rear wheel 114 by revolving together with the engine, thus regulating the power distribution of the front wheel 107 and the rear wheel 114, and further to regulate the system operating in all wheel driving to facilitate the operation in various operational requirements including accelerating, climbing a slope, downgrading a slope, anti-sliding, and braking; or (3) when the engine operated as the revolution power unit 100, the clutch 102 is closed, the brake 116 and the clutch 1016 are disengaged, the clutch 1116 is closed and the brake 126 is disengaged, the power supplied from the rechargeable device 117 subject to the control of the drive circuit device 115 drives the electromechanical device 108 to revolve clockwise or counter-clockwise as a motor so that to drive the rear wheel 114 by revolving together with the engine, thus regulating the power of the rear wheel 114 to facilitate the operation in various operational requirements including accelerating, climbing a slope, downgrading a slope, anti-sliding, and braking and to enable the engine being operated at the region having brake specific fuel consumption (BSFC), higher fuel efficiency and higher fuel economizing; or (4) when the engine operated as the revolution power unit 100, both of the clutches 102 and 1016 are closed, the brake 126 is disengaged, the clutch 1116 is closed and the brake 116 is disengaged, the power supplied from the rechargeable device 117 subject to the control of the drive circuit device 115 drives the electromechanical device 108 to revolve clockwise or counter-clockwise as a motor so that to drive the front wheel 107 and the rear wheel 114 by revolving together with the engine, thus regulating the power distribution of the front wheel 107 and the rear wheel 114, and further to regulate the system operating in all wheel driving to facilitate the operation in various operational requirements including accelerating, climbing a slope, downgrading a slope, anti-sliding, and braking and to enable the engine being operated at the region having brake specific fuel consumption (BSFC), higher fuel efficiency and higher fuel economizing; or (5) when the engine operated as the revolution power unit 100, the clutch 102 is closed, the clutch 1016 and the brake 126 are disengaged, the clutch 1116 is closed and the brake 116 is disengaged, by having the differential shaft 105 of the differential hybrid power device 104 coupled to the output end of the revolving kinetics of the intermediate transmission and control interface device 103 through the clutch 1116, and having the differential shaft 110 of the differential hybrid power device 104 coupled to the rear-wheel differential wheel set 113 for driving the rear wheel 114, the rpm difference is generated between the differential shaft 105 and the differential shaft 110 of the differential hybrid power device 104, so as to drive the electromechanical device 108 to generate function of a generator to charge the rechargeable device 117 by taking advantage of the rpm difference between the two shafts while controlling the size of the charging amperage to further control the size of the differential coupling torque for regulating the power of the rear wheel 114; or (6) when the engine operated as the revolution power unit 100, the clutch 1002 is closed, the clutch 1016 and the brake 126 are disengaged, the clutch 1116 is closed and the brake 116 is disengaged, by having the differential shaft 105 of the differential hybrid power device 104 coupled to the output end of the revolving kinetics of the intermediate transmission and control interface device 103 through the clutch 1116, and having the differential shaft 110 of the differential hybrid power device 104 coupled to the rear-wheel differential wheel set 113 for driving the rear wheel 114, the rpm difference is generated between the differential shaft 105 and the differential shaft 110 of the differential hybrid power device 104, so as to drive the electromechanical device 108 generating function of a generator to charge the rechargeable device 117 by taking advantage of the rpm difference between the two shafts while controlling the size of the charging amperage to further control the size of the differential coupling torque for regulating the power of the rear wheel 114 as well as enabling the engine being operated at the region having brake specific fuel consumption (BSFC), higher fuel efficiency and higher fuel economizing; or (7) when the engine operated as the revolution power unit 100, the clutch 102, 1016 and the brake 126 are closed, and the clutch 1116 and the brake 116 are disengaged, the differential shaft 105 of the differential hybrid power device 104 is secured by the brake 126 and the differential shaft 110 of the differential hybrid power device 104 is arranged to couple to the rear-wheel differential wheel set 113 for driving the rear wheel 114, while the engine drives the front wheel 107, the rear wheel 114 disposed on the co-structured carrier provided with the front wheel 107 is driven by drag, thus the rpm difference is generated between the differential shaft 105 and the differential shaft 110 of the differential hybrid power device 104, so as to drive the electromechanical device 108 generating function of a generator to charge the rechargeable device 117 by taking advantage of the rpm difference between the two shafts while controlling the size of the charging amperage to further control the size of the differential coupling torque for regulating the power of the front wheel 107; or (8) when the engine operated as the revolution power unit 100, the clutch 102, 1016 and the brake 126 are closed, and the clutch 1116 and the brake 116 are disengaged, the differential shaft 105 of the differential hybrid power device 104 is secured by the brake 126 and the differential shaft 110 of the differential hybrid power device 104 is arranged to couple to the rear-wheel differential wheel set 113 for driving the rear wheel 114, while the engine drives the front wheel 107, the rear wheel 114 disposed on the co-structured vehicle provided with the front wheel 107 is driven by drag of, thus the rpm difference is generated between the differential shaft 105 and the differential shaft 110 of the differential hybrid power device 104, so as to drive the electromechanical device 108 generating the function of a generator to charge the rechargeable device 117 by taking advantage of the rpm difference between the two shafts while controlling the size of the charging amperage to further control the size of the differential coupling torque for regulating the power of the front wheel 107 as well as enabling the engine being operated at the region having brake specific fuel consumption (BSFC), higher fuel efficiency and higher fuel economizing; or (9) when the engine operated as the revolution power unit 100, the clutch 102 is closed, the clutch 1016, and the brake 126 are disengaged, the clutch 1116 is closed and the brake 116 is disengaged, the differential shaft 105 of the differential hybrid power device 104 is coupled to the revolving kinetics output end of the intermediate transmission and control interface device 103 and the differential shaft 110 of the differential hybrid power device 104 directly or through the rear-wheel differential wheel set 113 drives the rear wheel 114, and the electric power from rechargeable device 117 subject to the control of the drive circuit device 115 drives the electromechanical device 108 of the differential hybrid power device 104 to function as a motor and to accumulate rpm so as to assist the engine driving the rear wheel 114; or (10) when the engine operated as the revolution power unit 100, the clutch 102, 1016 are closed, the brake 126 is disengaged, the clutch 1116 is closed and the brake 116 is disengaged, the differential shaft 105 of the differential hybrid power device 104 is coupled to the revolving kinetics output end of the intermediate transmission and control interface device 103 and the differential shaft 110 of the differential hybrid power device 104 directly or through the rear-wheel differential wheel set 113 drives the rear wheel 114, and the electric power from rechargeable device 117 subject to the control of the drive circuit device 115 drives the electromechanical device 108 of the differential hybrid power device 104 to function as a motor and to accumulate rpm so as to assist the engine driving both the front wheel 107 and the rear wheel 114 and further to regulate the system executing the operation of all wheel driving; or (11) when the engine operated as the revolution power unit 100, the clutch 102 is closed, the clutch 1016 and the brake 126 are disengaged, the clutch 1116 is closed and the brake 116 is disengaged, the differential shaft 105 of the differential hybrid power device 104 is coupled to the revolving kinetics output end of the intermediate transmission and control interface device 103 and the differential shaft 110 of the differential hybrid power device 104 directly or through the rear-wheel differential wheel set 113 drives the rear wheel 114, and the electric power from rechargeable device 117 subject to the control of the drive circuit device 115 drives the electromechanical device 108 of the differential hybrid power device 104 to function as a motor, thus to assist the engine driving the rear wheel 114 and to enable the engine being operated at the region having brake specific fuel consumption (BSFC), higher fuel efficiency and higher fuel economizing;

(12) when the engine operated as the revolution power unit 100, the clutch 102, 1016 are closed, the brake 126 is disengaged, the clutch 1116 is closed and the brake 116 is disengaged, the differential shaft 105 of the differential hybrid power device 104 is coupled to the revolving kinetics output end of the intermediate transmission and control interface device 103 and the differential shaft 110 of the differential hybrid power device 104 directly or through the rear-wheel differential wheel set 113 drives the rear wheel 114, and the electric power from rechargeable device 117 subject to the control of the drive circuit device 115 drives the electromechanical device 108 of the differential hybrid power device 104 to function as a motor, thus to assist the engine driving both the front wheel 107 and the rear wheel 114 and further to regulate the system executing the operation of all wheel driving as well as to enable the engine being operated at the region having brake specific fuel consumption (BSFC), higher fuel efficiency and higher fuel economizing; or (13) the clutch 1116 is disengaged, the brake 126 is closed and the brake 116 is disengaged; the electric power from the rechargeable device 117 subject to the control of the drive circuit device 115 drives the electromechanical device 108 of the differential hybrid power device 104 to separately execute clockwise or counter-clockwise revolving output to drive the rear wheel 114; or (14) when the engine operated as the revolution power unit 100, both of the clutches 102 and 1016 are closed, the brake 116 and the clutch 1116 are disengaged, and the brake 126 is closed, the engine kinetics through the clutch 1016 drives the front wheel 107, and the electric power from the rechargeable device 117 subject to the control of the drive circuit device 115 drives the electromechanical device 108 of the differential hybrid power device 104 to function as a motor, thus to drive the rear wheel 114 and further to regulate the system to execute the operation of all wheel driving; or (15) when the engine operated as the revolution power unit 100, both of the clutches 102 and 1016 are closed, the brake 116 and the clutch 1116 are disengaged and the brake 126 is closed, the engine kinetics through the clutch 1016 drives the front wheel 107, and the electric power from the rechargeable device 117 subject to the control of the drive circuit device 115 drives the electromechanical device 108 of the differential hybrid power device 104 to function as a motor, thus to drive the rear wheel 114 and further to regulate the system executing the operation of all wheel driving as well as to enable the engine being operated at the region having brake specific fuel consumption (BSFC), higher fuel efficiency and higher fuel economizing;

(16) when the engine operated as the revolution power unit 100, both of the clutches 102 and 1016 are closed, the brake 116, the clutch 1116 and the brake 126 are disengaged, the revolving kinetics from the revolution power unit 100 drives the front wheel 107; or (17) when the engine operated as the revolution power unit 100, the clutch 102 is closed, the clutch 1016 and the brake 126 are disengaged, and the brake 116 and the clutch 1116 are closed, the revolving kinetics from the revolution power unit 100 drives the rear wheel 114; or (18) when the engine operated as the revolution power unit 100, the clutches 102 and 1016 are closed, the brake 126 is disengaged, and the brake 116 and the clutch 1116 are closed, the revolving kinetics from the revolution power unit 100 drives both the rear wheel 114 and the front wheel 107, thus further to regulate the system executing the operation of all wheel driving; or (19) when the engine operated as the revolution power unit 100, the clutch 102 is closed or disengaged, the clutch 1016, the brake 116 and the clutch 1116 are disengaged, and the brake 126 is closed, in the event of driving down a slope, executing a brake, or an deceleration brake, the electromechanical device 108 of the differential hybrid power device 104 functions as a generator to charge the rechargeable device 117 or supply the power to other electrical driven load for executing a brake with regenerated power; or (20) when the engine operated as the revolution power unit 100, the clutches 102 and 1016 are closed, the brake 116, the clutch 1116 are disengaged and the brake 126 is in a closed braking status, in the event of driving down a slope, executing a brake, or an deceleration brake, the electromechanical device 108 of the differential hybrid power device 104 functions as a generator to charge the rechargeable device 117 or supply the power to other electrical driven loads for executing a brake with regenerated power to jointly execute the function of a brake with the damper of the engine; or (21) when the engine operated as the revolution power unit 100, the clutch 102, 1016, 1116 and the brake 116 are closed, and the brake 126 is disengaged, in the event of driving down a slope, executing a brake, or an deceleration brake, the damper of the engine operates as the function of a brake.

The energy storage type differential hybrid power distribution system can further construct the rpm ratios from the revolution power unit 100 respectively delivered to the front wheel 107 and the rear wheel 114 in various layouts of different rpm ratio. In the course of 4WD or all wheel driving or in the event of sliding, if the brake 116 is neither closed nor disposed, when being driven, the rpm between the differential shaft 105 and the differential shaft 110 of the differential hybrid power device 104 are different, including:

the rpm of differential shaft 105 is faster than that of differential shaft 110; or the rpm of the differential shaft 110 is faster than that of the differential shaft 105;

at driven as above, the rpm difference between the differential shaft 105 and the differential shaft 110 of the differential hybrid power device 104 serves as the function of a generator to charge the rechargeable device 117 or to supply power to other loads, and further enables the engine being operated at the region having brake specific fuel consumption (BSFC), higher fuel efficiency and higher fuel economizing;

In practical application, the energy storage type of differential hybrid power distribution system of the present invention drives both of the front and the rear wheel sets at the same time, or may only drive the front wheel set or the rear wheel set. Wherein:

the front wheel set includes one or a plurality of circular wheels, or any revolving wheel in a given geometric shape; and the rear wheel set includes one or a plurality of circular wheels, or any revolving wheel in a given geometric shape.

The wheel set described above includes a track structure.

Within the system of the present invention, clutches 102, 1016, 1116 and the brakes 116, 126 are all optional devices and the operating functions of the system are relatively increased or decreased. The inference of the increased or decreased functions is well known to those who are familiar with the art of the AWD, and thus will not be elaborated herein.

In conclusion, the energy storage type of differential power distribution system of the present invention may be applied in a vehicle, sea vessel or any other AWD carrier with fixed type of compound drive power. In practical applications, peripherals for the output may be selected as applicable to give more flexibility in choosing the system required.

The invention claimed is:

1. An energy storage type of differential hybrid power distribution system of the present invention adapted to an all wheel driving (AWD) transportation means and having an output end from an internal combustion engine (or any other revolving power source) to deliver revolving kinetics through an intermediate transmission and control interface device or a coupling device providing gear-changing or clutching function so that to transmit power to drive a front wheel via the front-wheel transmission assembly, and to transmit power to an input end of a storage type of differential hybrid power device, then to drive a rear wheel through an output end of the storage type of differential hybrid power device, wherein the storage type of differential hybrid power device includes an electromechanical device provided with functions as a motor and as a generator, a three-end shaft differential wheel set, a rechargeable device, and a power control device, the three-end shaft differential wheel set includes first and second differential shafts and an input shaft, wherein the input shaft is directly or indirectly coupled through a transmission to a rotation part of the electromechanical device, the first differential shaft is coupled to the end for outputting revolving kinetics of the intermediation transmission and the interface control device, and the second differential shaft drives a rear wheel or drives other loads; further comprising:

a revolution power unit (100): comprised of an internal combustion engine or other revolution power source, a revolution output shaft (101), coupled through a first clutch (102) or an intermediate transmission and control interface device (103) that provides gearshift function, then through the front-wheel transmission assembly (106) to drive a front wheel (107), and through a differential hybrid power device (104) directly or further through a differential wheel set (113) to drive a rear wheel (114);

the intermediate transmission and control interface device (103): comprised of a conventional manual operation interface device including an automatic transmission or manual transmission or manually controlled automatic gearshift device and other clutches provided for gearshift to drive the front wheel (107); the input end of the intermediate transmission and control interface device (103) receiving the input of revolving kinetics from the revolution power unit (100) and a first output end of the intermediate transmission and control interface device drives a front-wheel transmission assembly (106) to further drive the front wheel (107); and a second output end of the intermediate transmission and control interface device (103) is provided for coupling the first differential shaft (105) of the differential hybrid power device (104) to transmit revolving kinetics for the second differential shaft (110) of the differential hybrid power device (104) to directly or indirectly through the differential wheel set (113), couple to a rear wheel (114);

the differential hybrid power device (104): comprised of an electromechanical device (108) incorporated with a three-end shaft differential wheel set (109) including the first and second differential shafts (105), (110), and an input shaft (111); the input shaft is directly or indirectly coupled through a transmission device to the electromechanical device (108), the first differential shaft (105) is directly or indirectly coupled through a second clutch (1116) to the second output end of the intermediate transmission and control interface device (103), and the second differential shaft (110) is directly or indirectly through a differential wheel set (113) coupled to the rear wheel (114) or drives other loads, wherein the three-end shaft differential wheel set (109) may be a planetary wheel set or a friction transmission device or any other transmission;

the first differential shaft (105): to output through the intermediate transmission and control interface device (103) with its rpm at the same ratio as or a different ratio from that of from the output shaft (101) of the revolution power unit (100);

the front-wheel transmission assembly (106): an item comprised of a conventional transmission mechanism to input the revolving kinetics from the intermediate transmission and control interface device (103) to further drive the front wheel (107); a front-wheel differential wheel set (1017) is adapted for both of the differential output ends of the differential wheel set (1017) to drive the front wheel (107); or a transmission wheel set is provided to separately drive the load or a controllable third clutch (1016) is provided to transmit or cutoff the revolving kinetics to drive the front-wheel differential wheel set (1017) and the front wheel (107) from the intermediate transmission and control interface device (103);

the third clutch (1016) is a clutch device driven by manual, mechanical, electromagnetic or eccentric force, or comprised of a one-way transmission, disposed between the revolving kinetics output end of the intermediate transmission and control interface device (103) and the front-wheel differential wheel set (1017) subject to the manipulation by a central controller (118) to execute engagement or disengagement, to couple to or to cut from the revolving kinetics between the front wheel (107) and the intermediate transmission and control interface device (103);

the second clutch (1116) is a clutch driven by manual, mechanical, electromagnetic, fluid, or eccentric force, or to a one-way transmission; disposed between the second output end of the intermediate transmission and control interface device (103) and the first differential shaft (105) of the differential hybrid power device (104) subject to control by the central controller (118) to execute engagement or disengagement, to couple to or to cut from the revolving kinetics between the intermediate transmission and control interface device (103) and the differential hybrid power device (104);

a first brake (116) is a braking device with its braking function controllable by manual, mechanical, electromagnetic, or fluid force; disposed between a rotor and a static case of the electromechanical device (108);

a second brake (126) is a braking device with its braking function controllable by manual, mechanical, electromagnetic, or fluid force; disposed between a rotor and a static case of the first differential shaft (105);

the electromechanical device (108): comprised of an AC, DC, brush, or brush-less electromechanical structure to execute drive by being subject to the drive circuit device (115), the first brake (116) is being subject to the control by the central controller (118) to further control braking or releasing of braking between the rotor and the case of static case of the electromechanical device (108);

when powered, the electromechanical device (108) functions as a motor; and when driven by the revolving kinetics, it functions as a generator to charge the rechargeable device (117) or supply power to other load, A reverse torque is created from the current outputted by the electromechanical device to provide differential damper function at the three-end shaft differential wheel set coupled to the electromechanical device, or to provide regenerated braking function upon executing the braking, the engine serving as the primary drive force and rpm difference takes place between the front wheel and the rear wheel due to changed road conditions, the electromechanical device (108) adapted to the differential hybrid power device (104) functions as a generator to charge the rechargeable device, and the power so charged controls the reverse torque of the electromechanical device (108), thus to provide passive regulation of the power distribution between the front wheel and the rear wheel; and if rpm difference takes place between the front wheel and the rear wheel due to changed road conditions, or driving on an upward or downward slope, or applying acute acceleration that warrants regulation of power distribution between the front wheel and the rear wheel, the electromechanical device (108) being subject to the central controller (118) and the drive circuit device (115) being driven by power supplied from the rechargeable device (117) to revolve clockwise or counter-clockwise as a motor to separately output revolving kinetics to drive the load or jointly with the engine to drive both the front wheel (107) and the rear wheel (114) at the same time; or to provide active regulation of the power distribution between the front wheel and the rear wheel by taking advantage of the motor revolving clockwise or counter-clockwise;

the drive circuit device (115) is a dynamo-electric or solid status electronic device; disposed between the electromechanical device (108) and the rechargeable device (117) to operate according to the command given by the central controller (118) to control the electromechanical device (108) to function as a motor to revolve clockwise or counter-clockwise, or to control the electromechanical device (108) to function as a generator for charging the rechargeable device (117) or outputting the power to other load while controlling the power distribution between the front wheel and the rear wheel by controlling the outputted power to create reverse torque at the electromechanical device (108);

the central controller (118) is a dynamo-electric or solid status electronic device for outputting control commands to the drive circuit device (115) so as to regulate the electromechanical device (108), the revolution power unit (100) as well as said clutches and brakes;

the rechargeable device (117) is a rechargeable secondary battery, capacitor, or super-capacitor;

the front wheel (107) is one or a plurality of wheel sets, tracks or other loads driven directly by the intermediate transmission and control interface device (103) or indirectly driven from the intermediate transmission and control interface device (103) through the front wheel transmission device (106); and the rear wheel (114) is one or a plurality of wheel sets, tracks or other loads directly driven or driven through a transmission or a differential wheel set (113);

in the energy storage type of differential hybrid power distribution system, the structural configuration among each component is selectable as applicable and constructed as follows, wherein:

ways to dispose the differential hybrid power device (104) are selected based upon structural requirements as follows:

(1) the differential hybrid power device (104) is co-structured with the differential wheel set (113); or (2) the differential hybrid power device (104) is co-structured with the intermediate transmission and control interface device (103); or (3) the differential hybrid power device (104) is disposed between the intermediate transmission and control interface device (103) and the differential wheel set (113);

ways to dispose the brake (126) and the clutch (1116) are selected based upon structural requirements as follows:

(1) the second brake (126) is disposed to the differential hybrid power device (104); or (2) the second brake (126) together with the second clutch (1116) is disposed to the intermediate transmission and control interface device (103); or (3) the second clutch (1116) is disposed to the intermediate transmission and control interface device (103); or (4) the second clutch (1116) together with the second brake (126) are disposed to the differential hybrid power device (104); or (5) the second clutch (1116) is co-structured with the second brake (126); or (6) the second clutch (1116) is disposed independently; or (7) the second brake (126) is disposed independently; or (8) the second brake (126) and the second clutch (1116) are co-structured, but are disposed independently, ways to dispose the first clutch (102) are selected based upon structural requirements as follows:

(1) the first clutch (102) is disposed to the revolving power unit (100); or (2) the first clutch (102) is disposed to the intermediate transmission and control interface device (103); or (3) the first clutch (102) is independently disposed between the revolving power unit (100) and the intermediate transmission and control interface device (103).

2. An energy storage type of differential hybrid power distribution system as claimed in claim 1, wherein the differential regulation or power distribution between the front wheel (107) and the rear wheel (114) by the electromechanical device (108) adapted to the energy storage type of differential hybrid power distribution system is provided including that the power supplied from the rechargeable device (117) drives the electromechanical device (108) to function as a motor revolving clockwise or counter-clockwise to provide active regulation of the rpm difference or power distribution between the front wheel and the rear wheel; or the electromechanical device (108) as driven by the revolving kinetics through the 3-end shaft differential wheel set (109) functions as a generator to charge the rechargeable device (117) or supply power to other power driven load, the output of power so generated creates reverse torque at the electromechanical device (108) to provide the function of creating differential damper at the 3-end shaft differential wheel set (109) coupled to the electromechanical device (108), thus to provide passive regulation of the rpm difference between the front wheel (107) and the rear wheel (114);

the energy storage type of differential hybrid power distribution system of the present invention when applied in an all wheel driving carrier provides all or a part of the following functions through the operation of the intermediate transmission and control interface device (103) and the control by the central controller (118) to operate the first clutch (102), the third clutch (1016), the second clutch (1116), the first brake (116) and the second brake (126), and to drive the electromechanical device (108) through the drive circuit device (115), including:

(1) when the engine is operated as the revolution power unit (100), the first clutch (102) is closed, the third and second clutches (1016), (1116) and the second and first brakes (126), (116) are disengaged, the power supplied from the rechargeable device (117) subject to the control of the drive circuit device (115) drives the electromechanical device (108) to revolve clockwise or counter-clockwise as a motor so that to drive the rear wheel (114) by revolving together with the engine, thus regulating a power of the rear wheel (114) to facilitate the operation in various operational requirements including accelerating, climbing a slope, downgrading a slope, anti-sliding, and braking; or (2) when the engine is operated as the revolution power unit (100), both of the first and third clutches (102) and (1016) are closed, the second brake (126) is disengaged, the second clutch (1116) is closed and the first brake (116) is disengaged, the power supplied from the rechargeable device (117) subject to the control of the drive circuit device (115) drives the electromechanical device (108) to revolve clockwise or counter-clockwise as a motor so that to drive the front wheel (107) and the rear wheel (114) by revolving together with the engine, thus regulating the power distribution of the front wheel (107) and the rear wheel (114), and further to regulate the system operating in all wheel driving to facilitate the operation in various operational requirements including accelerating, climbing a slope, downgrading a slope, anti-sliding, and braking; or (3) when the engine is operated as the revolution power unit (100), the first clutch (102) is closed, the first brake (116) and the third clutch (1016) are disengaged, the second clutch (1116) is closed and the second brake (126) is disengaged, the power supplied from the rechargeable device (117) subject to the control of the drive circuit device (115) drives the electromechanical device (108) to revolve clockwise or counter-clockwise as a motor so that to drive the rear wheel (114) by revolving together with the engine, thus regulating the power of the rear wheel (114) to facilitate the operation in various operational requirements including accelerating, climbing a slope, downgrading a slope, anti-sliding, and braking and to enable the engine being operated at a region having brake specific fuel consumption (BSFC), higher fuel efficiency and higher fuel economizing; or (4) when the engine operated as the revolution power unit (100), both of the first and third clutches (102) and (1016) are closed, the second brake (126) is disengaged, the second clutch (1116) is closed and the first brake (116) is disengaged, the power supplied from the rechargeable device (117) subject to the control of the drive circuit device (115) drives the electromechanical device (108) to revolve clockwise or counter-clockwise as a motor so that to drive the front wheel (107) and the rear wheel (114) by revolving together with the engine, thus regulating the power distribution of the front wheel (107) and the rear wheel (114), and further to regulate the system operating in all wheel driving to facilitate the operation in various operational requirements including accelerating, climbing a slope, downgrading a slope, anti-sliding, and braking and to enable the engine being operated at the region having brake specific fuel consumption (BSFC), higher fuel efficiency and higher fuel economizing; or (5) when the engine is operated as the revolution power unit (100), the first clutch (102) is closed, the third clutch (1016) and the second brake (126) are disengaged, the second clutch (1116) is closed and the first brake (116) is disengaged, by having the first differential shaft (105) of the differential hybrid power device (104) coupled to the output end of the revolving kinetics of the intermediate transmission and control interface device (103) through the second clutch (1116), and having the second differential shaft (110) of the differential hybrid power device (104) coupled to the rear-wheel differential wheel set (113) for driving the rear wheel (114), the rpm difference is generated between the first differential shaft (105) and the second differential shaft (110) of the differential hybrid power device (104), so as to drive the electromechanical device (108) to generate function of a generator to charge the rechargeable device (117) by taking advantage of the rpm difference between the two shafts while controlling a size of a charging amperage to further control a size of a differential coupling torque for regulating the power of the rear wheel (114); or (6) when the engine is operated as the revolution power unit (100), the first clutch (102) is closed, the third clutch (1016) and the second brake (126) are disengaged, the second clutch (1116) is closed and the first brake (116) is disengaged, by having the first differential shaft (105) of the differential hybrid power device (104) coupled to the output end of the revolving kinetics of the intermediate transmission and control interface device (103) through the second clutch (1116), and having the second differential shaft (110) of the differential hybrid power device (104) coupled to the rear-wheel differential wheel set (113) for driving the rear wheel (114), the rpm difference is generated between the first differential shaft (105) and the second differential shaft (110) of the differential hybrid power device (104), so as to drive the electromechanical device (108) generating function of a generator to charge the rechargeable device (117) by taking advantage of the rpm difference between the two shafts while controlling the size of the charging amperage to further control the size of the differential coupling torque for regulating the power of the rear wheel (114) as well as enabling the engine being operated at the region having brake specific fuel consumption (BSFC), higher fuel efficiency and higher fuel economizing; or (7) when the engine is operated as the revolution power unit (100), the first and third clutches (102), (1016) and the second brake (126) are closed, and the second clutch (1116) and the first brake (116) are disengaged, the first differential shaft (105) of the differential hybrid power device (104) is secured by the second brake (126) and the second differential shaft (110) of the differential hybrid power device (104) is arranged to couple to the rear-wheel differential wheel set (113) for driving the rear wheel (114), while the engine drives the front wheel (107), the rear wheel (114) disposed on the co-structured carrier provided with the front wheel (107) is driven by drag, thus the rpm difference is generated between the first differential shaft (105) and the second differential shaft (110) of the differential hybrid power device (104), so as to drive the electromechanical device (108) generating function of a generator to charge the rechargeable device (117) by taking advantage of the rpm difference between the first and second differential shafts while controlling the size of the charging amperage to further control the size of the differential coupling torque for regulating the power of the front wheel (107); or (8) when the engine is operated as the revolution power unit (100) the first and third clutches (102), (1016) and the second brake (126) are closed, and the second clutch (1116) and the second brake (116) are disengaged, the first differential shaft (105) of the differential hybrid power device (104) is secured by the second brake (126) and the second differential shaft (110) of the differential hybrid power device (104) is arranged to couple to the rear-wheel differential wheel set (113) for driving the rear wheel (114), while the engine drives the front wheel (107), the rear wheel (114) disposed on the co-structured vehicle provided with the front wheel (107) is driven by drag of, thus the rpm difference is generated between the first differential shaft (105) and the second differential shaft (110) of the differential hybrid power device (104), so as to drive the electromechanical device (108) generating the function of a generator to charge the rechargeable device (117) by taking advantage of the rpm difference between the two shafts while controlling the size of the charging amperage to further control the size of the differential coupling torque for regulating the power of the front wheel (107) as well as enabling the engine being operated at the region having brake specific fuel consumption (BSFC), higher fuel efficiency and higher fuel economizing; or (9) when the engine is operated as the revolution power unit (100), the clutch (102) is closed, the third clutch (1016), and the second brake (126) are disengaged, the second clutch (1116) is closed and the first brake (116) is disengaged, the first differential shaft (105) of the differential hybrid power device (104) is coupled to the revolving kinetics output end of the intermediate transmission and control interface device (103) and the second differential shaft (110) of the differential hybrid power device (104) directly or through the rear-wheel differential wheel set (113) drives the rear wheel (114), and the electric power from rechargeable device (117) subject to the control of the drive circuit device (115) drives the electromechanical device (108) of the differential hybrid power device (104) to function as a motor and to accumulate rpm so as to assist the engine driving the rear wheel (114); or (10) when the engine is operated as the revolution power unit (100), the first and third clutches (102), (1016) are closed, the second brake (126) is disengaged, the second clutch (1116) is closed and the first brake (116) is disengaged, the first differential shaft (105) of the differential hybrid power device (104) is coupled to the revolving kinetics output end of the intermediate transmission and control interface device (103) and the second differential shaft (110) of the differential hybrid power device (104) directly or through the rear-wheel differential wheel set (113) drives the rear wheel (114), and the electric power from rechargeable device (117) subject to the control of the drive circuit device (115) drives the electromechanical device (108) of the differential hybrid power device (104) to function as a motor and to accumulate rpm so as to assist the engine driving both the front wheel (107) and the rear wheel (114) and further to regulate the system executing an operation of all wheel driving; or (11) when the engine is operated as the revolution power unit (100), the first clutch (102) is closed, the third clutch (1016) and the second brake (126) are disengaged, the second clutch (1116) is closed and the first brake (116) is disengaged, the first differential shaft (105) of the differential hybrid power device (104) is coupled to the revolving kinetics output end of the intermediate transmission and control interface device (103) and the second differential shaft (110) of the differential hybrid power device (104) directly or through the rear-wheel differential wheel set (113) drives the rear wheel (114), and the electric power from rechargeable device (117) subject to the control of the drive circuit device (115) drives the electromechanical device (108) of the differential hybrid power device (104) to function as a motor, thus to assist the engine driving the rear wheel (114) and to enable the engine being operated at the region having brake specific fuel consumption (BSFC), higher fuel efficiency and higher fuel economizing;

(12) when the engine is operated as the revolution power unit (100), the first and third clutches (102), (1016) are closed, the second brake (126) is disengaged, the second clutch (1116) is closed and the first brake (116) is disengaged, the first differential shaft (105) of the differential hybrid power device (104) is coupled to the revolving kinetics output end of the intermediate transmission and control interface device (103) and the second differential shaft (110) of the differential hybrid power device (104) directly or through the rear-wheel differential wheel set (113) drives the rear wheel (114), and the electric power from rechargeable device 117 subject to the control of the drive circuit device (115) drives the electromechanical device (108) of the differential hybrid power device (104) to function as a motor, thus to assist the engine driving both the front wheel (107) and the rear wheel (114) and further to regulate the system executing the operation of all wheel driving as well as to enable the engine being operated at the region having brake specific fuel consumption (BSFC), higher fuel efficiency and higher fuel economizing; or (13) the second clutch (1116) is disengaged, the second brake (126) is closed and the first brake (116) is disengaged; the electric power from the rechargeable device (117) subject to the control of the drive circuit device (115) drives the electromechanical device (108) of the differential hybrid power device (104) to separately execute clockwise or counter-clockwise revolving output to drive the rear wheel (114); or (14) when the engine is operated as the revolution power unit 100, both of the first and third clutches (102) and (1016) are closed, the first brake (116) and the second clutch (1116) are disengaged, and the second brake (126) is closed, the engine kinetics through the third clutch (1016) drives the front wheel (107), and the electric power from the rechargeable device (117) subject to the control of the drive circuit device (115) drives the electromechanical device (108) of the differential hybrid power device (104) to function as a motor, thus to drive the rear wheel (114) and further to regulate the system to execute the operation of all wheel driving; or (15) when the engine is operated as the revolution power unit (100), both of the first and third clutches (102) and (1016) are closed, the first brake (116) and the second clutch (1116) are disengaged and the second brake (126) is closed, the engine kinetics through the third clutch (1016) drives the front wheel (107), and the electric power from the rechargeable device (117) subject to the control of the drive circuit device (115) drives the electromechanical device (108) of the differential hybrid power device (104) to function as a motor, thus to drive the rear wheel (114) and further to regulate the system executing the operation of all wheel driving as well as to enable the engine being operated at the region having brake specific fuel consumption (BSFC), higher fuel efficiency and higher fuel economizing;

(16) when the engine is operated as the revolution power unit 100, both of the first and third clutches (102) and (1016) are closed, the first brake (116), the second clutch (1116) and the second brake (126) are disengaged, the revolving kinetics from the revolution power unit (100) drives the front wheel (107); or (17) when the engine is operated as the revolution power unit (100), the first clutch (102) is closed, the third clutch (1016) and the second brake (126) are disengaged, and the first brake (116) and the second clutch (1116) are closed, the revolving kinetics from the revolution power unit (100) drives the rear wheel (114); or (18) when the engine is operated as the revolution power unit (100), the first and third clutches (102) and (1016) are closed, the second brake (126) is disengaged, and the first brake (116) and the second clutch (1116) are closed, the revolving kinetics from the revolution power unit (100) drives both the rear wheel (114) and the front wheel (107), thus further to regulate the system executing the operation of all wheel driving; or (19) when the engine is operated as the revolution power unit (100), the first clutch (102) is closed or disengaged, the third clutch (1016), the first brake (116) and the second clutch (1116) are disengaged, and the second brake (126) is closed, in the event of driving down a slope, executing a brake, or a deceleration brake, the electromechanical device (108) of the differential hybrid power device (104) functions as a generator to charge the rechargeable device (117) or supply the power to other electrical driven load for executing a brake with regenerated power; or (20) when the engine is operated as the revolution power unit (100), the first and third clutches (102) and (1016) are closed, the first brake (116), the second clutch (1116) are disengaged and the second brake (126) is in a closed braking status, in the event of driving down a slope, executing a brake, or a deceleration brake, the electromechanical device (108) of the differential hybrid power device (104) functions as a generator to charge the rechargeable device (117) or supply the power to other electrical driven loads for executing a brake with regenerated power to jointly execute a function of a brake with a damper of the engine; or (21) when the engine is operated as the revolution power unit (100), the first third and second clutches (102), (1016), (1116) and the first brake (116) are closed, and the second brake (126) is disengaged, in the event of driving down a slope, executing a brake, or a deceleration brake, the damper of the engine operates as a brake.

3. An energy storage type of differential hybrid power distribution system as claimed in claim 1 is further constructed such that the rpm ratios from the revolution power unit (100) respectively delivered to the front wheel (107) and the rear wheel (114) in various layouts of different rpm ratio, in the course of all wheel driving or in the event of sliding, if the first brake (116) is neither closed nor disposed, when being driven, the rpm between the first differential shaft (105) and the second differential shaft (110) of the differential hybrid power device (104) are different, including:
- the rpm of the first differential shaft (105) is faster than that of the second differential shaft (110); or
- the rpm of the second differential shaft (110) is faster than that of the first differential shaft (105);
- driven as above, the rpm difference between the first differential shaft (105) and the second differential shaft (110) of the differential hybrid power device (104) serves a function of a generator to charge the rechargeable device (117) or to supply power to other loads, and further enables the engine to be operated at the region having brake specific fuel consumption (BSFC), higher fuel efficiency and higher fuel economizing.

4. An energy storage type of differential hybrid power distribution system as claimed in claim 1, when in practical application, the energy storage type of differential hybrid power distribution system of the present invention drives both of the front and the rear wheel sets at the same time, or may only drive the front wheel set or the rear wheel set wherein:
- the front wheel set includes one or a plurality of circular wheels, or any revolving wheel in a given geometric shape; and
- the rear wheel set includes one or a plurality of circular wheels, or any revolving wheel in a given geometric shape, or
- the wheel set described above includes a track structure.

* * * * *